United States Patent Office 3,180,771
Patented Apr. 27, 1965

3,180,771
METHOD OF PREPARING ROCKET MONO-PROPELLENT COMPOUNDS
Kiyoshi Hattori, Morton J. Klein, and Irvine J. Solomon, Chicago, Ted A. Erikson, Oak Lawn, and Gerald M. Platz, Elmhurst, Ill., assignors to IIT Research Institute, a corporation of Illinois
No Drawing. Filed Jan. 16, 1958, Ser. No. 709,423
1 Claim. (Cl. 149—45)

The instant invention relates to novel compounds which are useful as rocket monopropellant agents and to the manufacture thereof. More particularly, it relates to ammonium ozonate as a novel composition of matter per se, and further, to the novel compositions of ammonium ozonate in intimate relationship with ammonia or with ammonia and other selected materials. Our invention is also concerned with the various embodiments of the process whereby the foregoing novel compositions may be readily obtained.

It is known that many research workers are making determined efforts to develop new materials which are useful as rocket propulsion agents. The problem involved in such developments and at least some of the results therefrom have been fairly well publicized, subject, of course, to national security restrictions, and it is evident from the disclosures that many improvements remain to be made in the propellant field. Although conventional materials and techniques have progressed to quite good operational efficiencies, and in fact some of the accomplishments are extremely valuable, we must now look to new compositions of matter which are possessed of the proper energy requirements and other desirable features if this particular facet of our technology is to realize a continuing advance. To the best of our knowledge the preferred liquid monopropellants now available, under the most optimal conditions, illustrate a maximum specific impulse in the order of 235 seconds. The limitations inherent in such specific impulse values are well known to those skilled in this particular art and when such values are compared with the total energy made available from compounds produced in accordance with our invention it will be evident that the disclosure herein contained represents what may be considered a major technological breakthrough. Our compositions make available the energy of free radical reactions to further their utility. For the first time ammonium ozonate, $NH_4O_3$, has been produced, and in accordance with our invention may readily be manufactured to provide a material which according to performance calculations has a specific impulse of at least 285 seconds. In addition to such greater specific impulse and the advantages which inherently derive therefrom, our materials, in comparison with the more often used propulsion compounds, function as monopropellant agents: whereas in the conventional propellent systems separately contained fuels and oxidizing agents are necessarily required such dual containment is eliminated when our compositions are used. It should be apparent therefore that the novel compounds and solutions thereof disclosed and claimed herein are extremely useful as rocket monopropellants.

In view of the foregoing, one object of the instant invention is to provide a novel rocket monopropellant compound.

Another object of the instant invention is to provide a novel liquid monopropellant.

A further object of the instant invention is to provide a new composition of matter, namely ammonium ozonate, $NH_4O_3$.

A further object of the instant invention is to provide a novel composition of matter, namely ammonium ozonate in an environment of ammonia.

Still a further object of the instant invention is to provide a novel composition of matter, namely ammonium ozonate having what is considered to be molecularly bound ammonia in association therewith.

Yet another object of the instant invention is to provide a novel liquid monopropellant composed essentially of ammonium ozonate, ammonia and methylamine.

Still another object of the instant invention is to provide novel liquid monopropellants composed essentially of ammonium ozonate, or ammonium ozonate with related ammonia, in a suitable solvent carrier.

Still another object of the instant invention is to provide several closely related methods of producing ammonium ozonate.

Yet another object of the instant invention is to provide a method of producing a novel rocket monopropellant, $NH_4O_3$ in an ammonia environment.

A further object of our invention is to provide a rocket monopropellant, the combustion products of which are all volatile gases and thus no undesirable metal oxides or the like are deposited when such monopropellant is utilized.

Still a further object of our invention is to provide rocket monopropellant compositions which make use of free radical reactions.

Other objects, features and advantages of our invention will become apparent to those skilled in this particular art from the following detailed disclosure thereof.

At temperatures above $-78°$ C. ozone reacts with ammonia to yield ammonium nitrate as one end product. We have found that by carrying out such reaction at moderately low temperatures (i.e., $-100°$ C. or lower) such oxidation may be controlled to yield the dark red compound, $NH_4O_3$, instead of the nitrate. The material so produced is quite stable at such reaction temperatures and somewhat less stable in the range of from $-78$ to $-100°$ C., but rapidly decomposes to form oxygen, water and ammonium nitrate at temperatures higher than $-78°$ C.

In its most simple form our process of making both ammonium ozonate and the latter compound in association with ammonia consists in the intimate contacting of ammonia with ozone. Due to the instability of desired end product at temperatures even slightly above that at which pure ammonia freezes, various specialized techniques and conditions are required if a suitable and stable material is to be obtained. Similarly, special procedures are required if pure $NH_4O_3$ free of $NH_3$ is to be isolated, and accordingly in the following detailed disclosure are presented the various ramifications of our procedure.

At the onset of the experimentation which gave rise to our invention, we bubbled dilute gaseous ozone through liquid ammonia, such liquid being contained in a closed vessel open only to permit the passage of the ozonacious gas. The vessel in turn was surrounded by a refrigerant bath maintained at $-78°$ C. The temperature of the liquid ammonia per se was not determined during the bubbling process but since it is well established that ammonia liquifies at $-33°$ C. and freezes at $-78°$ C. (or more exactly $-77.8°$C.), and since we were utilizing liquid $NH_3$ at normal pressures, it is only reasonable to conclude that we were operating within such temperature range. Even more specifically, due to the heat transfer effects between the refrigerant and the liquid ammonia after a certain contact period it is evident that the $NH_3$ was only slightly warmer than $-78°$ C. At no time during this phase of our work was ammonia permitted to freeze.

Parenthetically, at this point it should be understood that by the terms "dilute gaseous ozone" or more simply "dilute ozone" which are referred to throughout the examples in the instant specification are meant a gaseous mixture containing from 1 to 10% ozone, the balance being substantially pure oxygen. It should also be understood that such a pure ozone-oxygen mixture is utilized as an example of only one specific ozone matter which is operative in the process, but that this is not a critical limitation in our invention. As a practical matter, in commercial production ozone produced from air may also be used in our process. This latter material may retain its nonreactive components, primarily nitrogen, without detracting from the end results. The ozone used herewith was produced by techniques well known in this art and its initial provision does not form a part of our invention. It was generated as required and was substantially at room temperature until its passage into the liquid ammonia. Additionally, for reasons that are more fully elaborated upon below, for most purposes it is preferable that the ozone mixture (i.e., ozone-oxygen or ozone-air) be dry rather than moisture bearing.

As the dilute ozone was bubbled through the liquid ammonia a red color momentarily appeared at the initial point of each bubble contact but such color rapidly faded and finally the solution became stabilized at a pale yellow. Since it is known that alkali metal ozonates are dark red solids, we felt that the fleeting red color so produced was undoubtedly $NH_4O_3$, and that it was rapidly decomposing into ammonium nitrate, and this was later confirmed. In view of this, our problem was in part to determine the procedure and conditions whereby the $NH_4O_3$ is stabilized and the formation of $NH_4NO_3$ suppressed. It is to this result that our invention is in most part directed and in the paragraphs following the procedures are fully discussed.

In order that the above initial procedure may be more specifically envisioned the details thereof are presented. We placed 5 to 10 mls. liquid $NH_3$ in a glass I-trap closed except for the passage of a glass bubbling tube. Such container was next surrounded by a bath of solid carbon dioxide in trichloroethylene maintained at $-78°$ C. and permitted to cool therein for from 10 to 20 minutes before the dilute gaseous ozone was bubbled through. In various specific instances bubbling took place for from 10 to 25 minutes. Although at the termination of a 25-minute bubbling period the ammonia solution could practically be at the freezing point of pure ammonia two factors primarily stayed freezing. Not only was the ozone at room temperature prior to entering the reaction sphere but furthermore there is a freezing point depressant effect from the solutes produced from the reaction. These factors assume even greater importance when the reactions are performed at lower temperatures.

It should be clearly understood that our process basically consists of the combination of ammonia with ozone at low temperatures. The following exemplary embodiments thereof are included within its scope:

I. To produce a $NH_4O_3$—$NH_3$ system:
  A. The treatment of liquid ammonia with dilute gaseous ozone (ozone-oxygen or ozone-air).
  B. The treatment of a solution of ammonia in a low freezing point solvent with dilute gaseous ozone.
  C. Subjecting an aqueous solution of ammonia to pure ozone.
  D. Treating solid ammonia with dilute gaseous ozone.
  E. A methylamine process that is elaborated upon below.

II. Means for producing ammonium ozonate:
  A. The treatment of ammonia gas with dilute gaseous ozone.
  B. The reaction of an alkali metal ozonate with ammonium chloride.
  C. The processes of I above wherein the $NH_3$ is removed from the system and the $NH_4O_3$ thus isolated.

Such embodiments of our process will next be considered.

I-A. *The reaction of dilute gaseous ozone upon liquid ammonia.*—In view of the instability and resultant rapid decomposition of the red compound when produced at an environmental temperature slightly above $-78°$ C. and the fact that at higher temperatures the decomposition was even more rapid, we reasoned that perhaps a colder environment would assist in stabilization. To this end we provided an ammonia receptacle bath maintained at $-100°$ C. The coolant used for this purpose was a slush bath containing a mixture of chloroform and trichloroethylene in such proportions whereby the mixture froze at $-100°$ C. As the ozone was bubbled through the liquid ammonia so refrigerated the dark red $NH_4O_3$ was produced throughout the solution. Such red color was quite stable and persisted indefinitely at $-100°$ C. (i.e., bath temperature) but as we permitted the temperature to slowly increase the red $NH_4O_3$ rapidly decomposed with attendant loss of color. There was no evidence of explosion, deflagration or burning during the latter decomposition.

More specifically for the above process, we used a 3% ozone stream (balance oxygen) and bubbled it through 5 to 10 mls. of liquid ammonia at a rate of approximately 50 ccs. per minute for 10 to 25 minutes. Prior to the admission of the ozone the $NH_3$ liquid was subjected to the bath environmental temperature for at least 10 minutes. The 25-minute throughput figure substantially represents the upper limit of exposure time before the $NH_3$ begins to freeze. Again the ammonium ozonate which results, acting in co-operation with the gaseous ozone stream, keeps the ammonia from freezing at temperatures below $-77°$ C. and thus ozone bubbling is still permitted despite the nominal below freezing environment.

We next attempted to isolate the $NH_4O_3$ from its ammonia environment by pumping off the excess thereof while still maintaining the reactor at $-100°$ C. In view of the temperature involved and the marked instability of $NH_4O_3$ above $-78°$ C. the technical difficulties of such procedure will be readily appreciated. Although the ammonia solution is now frozen it has a vapor pressure of 5 mm. Hg which permits a partial vacuum removal. Small amounts of pure $NH_4O_3$ may thus be isolated by vacuum pumping (at $10^{-5}$ mm. Hg) but for the most part not all of the $NH_3$ can be segregated from the $NH_4O_3$—$NH_3$ mass. Apparently there is molecular combination of such materials which enhances the separatory difficulties. However, such separation to the point of removing all of the ammonia is not too critical to rocket technology since the ammonia bearing crystals have an even higher specific impulse than pure ammonium ozonate, provided that there is not a considerable excess of ammonia. If such excess is present, there results a deficit of oxygen in the system with the consequent reduction of propulsion efficiency. The residue of 1 to 3 moles of ammonia per each mole of ammonium ozonate is permissible and provides an extremely desirable material for propulsion activities. In fact, there may be from zero to 3 moles or more of $NH_3$ for each mole of $NH_4O_3$.

B. *The treatment of an ammonia solution with dilute gaseous ozone.*—It will be readily realized by those skilled in this art that we encountered considerable difficulty in working with liquid ammonia at an environmental temperature of approximately $-100°$ C. During the reactive process the liquid could not be permitted to freeze for this would render bubbling impossible and thus limit the concentration of $NH_4O_3$ that could be produced. At the other temperature extreme the considerable instability of $NH_4O_3$ has been previously indicated. Thus, in order to first facilitate the $O_3$—$NH_3$ reaction and secondly to avoid using an excess of liquid ammonia, and further to provide a process whereby at the termination thereof there would be less ammonia to remove from the system than when pure liquid ammonia was used, we attempted to discover suitable solvent media for the ammonia which would still permit the reaction with ozone. As before the reaction was to occur at an environmental temperature of approximately −100° C. in order to suppress the $NH_4O_3 \to NH_4NO_3$ degradation. The medium so selected must meet the requirements of (1) freezing below approximately −100° C., (2) being capable of dissolving $NH_3$ or at least capable of dispersing it as fine particles, (3) not reacting with ozone at the low operational temperatures involved herein, and (4) not reactive with the ammonium ozonate as it is produced. Many compositions and mixtures fulfill these requirements but we found that a mixture of methyl and ethyl chlorides was the best solvent. Ammonia was dissolved in such latter mixture while the reactor flask was surrounded by a refrigerant bath maintained at −100° C. Following this, dilute gaseous ozone was bubbled through the solution in the same manner as it was passed through the pure $NH_3$ and again red, solid $NH_4O_3$ readily precipitated.

In order that this procedure may be fully understood a specific embodiment thereof is presented. To prepare the solvent medium 3 mls. of methyl chloride were mixed with 3 mls. of ethyl chloride in the reaction vessel. Such mixture was then surrounded by a refrigerant bath composed of a mixture of chloroform and trichloroethylene and 3 mils. of liquid $NH_3$ added thereto. Dilute gaseous ozone was bubbled through the solution at a rate of approximately 50 ccs. per minute for 15 minutes to rapidly yield the ammonium ozonate precipitate.

We also used pure methyl chloride as the solvent. Although it freezes at −98° C. it still satisfies all conditions required of the solvent in this particular practice. In one procedure a 10% ammonia content solution in methyl chloride was utilized and $NH_4O_3$ was again readily produced.

It should, of course, be understood that other suitable ammonia solvents or dispersants such as Freon 13 may also be used in the instant process.

Following the precipitation of the $NH_4O_3$ it may be readily separated in part from the $NH_3$, $CH_3Cl$ and $C_2H_5Cl$ by a vacuum pumping process. The organic chlorides are removable practically in toto but here again it is not possible to free all of the $NH_4O_3$ from ammonia and likewise we reasoned that some of the molecularly bound $NH_3$ gave rise to the difficulties encountered in such isolation procedure. It should be appreciated, of course, that this molecularly bound ammonia concept is merely that and the instant invention is not primarily based upon such theory. However, it will be further readily realized that in accordance with our process regardless of the theory of combination an extremely satisfactory rocket monopropellant composition is produced from our invention.

C. *Subjecting an aqueous solution of ammonia to pure ozone.*—We carried out several experiments in the attempt to combine liquid ammonia and concentrated ozone. Such experiments were performed at the temperature range of from −183 to −77° C. When a 100% ozone gas was contacted with solid $NH_3$ at −183° C. there was apparently no reaction. However as the materials were warmed slightly an explosion occurred. At higher temperatures (but still below −77° C.) whenever liquid $NH_3$ was permitted to contact concentrated ozone an explosion followed.

In view of the foregoing explosion problem and in the attempt to moderate the reaction, we diluted the $NH_3$ with water. Exemplifying the use of such aqueous solution is the treatment of a 28% aqueous ammonia solution with 100% ozone. More specifically, 2.8 grams of liquid $NH_3$ were dissolved in 7.2 grams of $H_2O$ and such solution subjected to concentrated ozone bubbling at the rate of approximately 50 ccs. per minute for a period of 10 to 25 minutes. The reactor was submerged in a refrigerant bath during the reaction period. There was no reaction at −183° C., but when the ammonia-water solution was warmed to sufficiently volatilize a portion of the ammonia the red color indicative of $NH_4O_3$ appeared. Subsequent warming of such solution to above −77° C. resulted, as we had expected from our prior work, in a color loss with the attendant conversion of the ozonate to the nitrate.

At this point it should be mentioned that although $NH_4O_3$ formation can occur in either the presence or absence of water, if the material is to be used as a rocket monopropellant the water content should be kept to a minimum. Water adds merely weight but no actual propellant properties to the system and an excess of water will substantially dampen the propellant properties of ammonium ozonate. For this reason if the aqueous ammonia-concentrated ozone reaction is used it is necessary to remove the water from the system. Similarly, this is the reason for using substantially dry ozone or dry ozone-bearing air in the non-aqueous embodiments of our process. It should be further mentioned that the reaction of ozone upon ammonia produces a very slight amount of water but in such amounts there is no practical reduction in propellant capabilities.

In addition to the process utilizing aqueous ammonia with a 100% ozone stream it is also possible to carry out such embodiment using lesser percentages of ozone. For example, we used a 25% concentration of ozone in Freon 13. Small quantities of liquid $NH_3$ at −77° C. were added to such ozone-Freon solution. A vigorous reaction occurred to yield the white solid, ammonium nitrate, but there were no explosions. In view of the presence of $NH_4NO_3$ it was reasoned that the reaction proceeded too rapidly through the ozonate stage.

In order to moderate the foregoing reaction an ammonia-methylcyclohexane mixture was added to the ozone-Freon 13 solution rather than merely ammonia per se. A deep red color indicative of ammonium ozonate appeared in the ammonia layer. It should be cautioned however that in some cases even this reaction can result in explosion.

Although Freon 13 is a well known commercial product, for the sake of clarity in the instant specification, it has the chemical composition: chlorotrifluoromethane.

D. *Treating solid ammonia with dilute gaseous ozone.*—In this procedure the ammonia is permitted to freeze at the bottom of the reaction vessel and dilute gaseous ozone is permitted to flow across the frozen surface. Because of the vapor pressure, however slight, a portion of the ammonia is entrained in the ozone and such intimate contact results in the reaction to form ammonium ozonate in combination with only a small amount of ammonia. In addition to the gas-gas reaction, the solid ammonia per se reacts with the gaseous ozone. The ammonium ozonate-ammonia is deposited upon the side walls of the reaction vessel and in many instances has a substantially lower ammonia content than the end product resulting from liquid ammonia procedures.

In order to increase the reaction rate it is feasible to enlarge the surface area of the ammonia solid. This may be readily accomplished by depositing the ammonia on a porous, glass wool matrix, or on other non-reactive matrices. For another procedure, particulate, frozen $NH_3$ may be dispersed in Freon 13, for example, prior to reaction with the dilute ozone.

E. *The process using methylamine.*—In this embodiment the ammonium ozonate is first produced. Following this, methylamine ($CH_3NH_2$) is distilled into the ammonium ozonate bearing solution. The temperature of the solution is then raised to about −95° C. from which results a liquid ammonia solution bearing ammonium ozonate and methylamine. Such solution is quite useful since methyl amine freezes at a considerably lower temperature than ammonia, i.e. −92° C., and has excellent propulsion features. The various concentrations of the three main constituents may be varied practically at will.

II-A. *The treatment of ammonia gas with dilute gaseous ozone.*—The problems and difficulties involved in the vacuum removal of ammonia in the $NH_4O_3$—$NH_3$ system are readily realized by those skilled in the operation of similar techniques, and in order to circumvent such problem we developed the instant procedure of forming $NH_4O_3$ free of $NH_3$ directly upon reaction. Ammonia is first permitted to freeze at the bottom of the reactor vessel. A stream of pure gaseous nitrogen is then passed over the frozen ammonia surface in much the same manner as the ozone indicated above. The frozen ammonia presents adequate vapor pressure whereby very small quantities of $NH_3$ are entrained in the nitrogen stream. Into such stream is then directed a flow of dilute gaseous ozone which reacts with the entrained $NH_3$ to result in the deposition of solid $NH_4O_3$ on the walls of the reactor vessel. Since the amount of ammonia carried from the solid is in part determined by the temperature of operation (e.g., approximately $-100°$ C.), it is removed at such a slow rate that it fully reacts with the ozone and thus there is no problem of $NH_3$ combination in such process.

The characteristics and properties of ammonium ozonate will next be considered. For such purposes the alkali ozonate-ammonium chloride reaction, discussed below, is used. We first decomposed the $NH_4O_3$ in the presence of ammonia. It is possible that the presence of the $NH_3$ may alter the mode of $NH_4O_3$ decomposition but this is not probable or in any event not a serious defect. The non-condensable gas found among the decomposition products was found to be oxygen. The vapor pressure of such gas at liquid nitrogen temperatures was found to be 155 mm. of mercury. Since the reported vapor pressure of $O_2$ at this temperature is 157 mm. Hg this is well within the range of experimental error to prove the presence of diatomic oxygen.

Following the removal of the oxygen the volatile products of the $NH_4O_3$—$NH_3$ material were checked by infrared analysis. To insure proper sampling three fractions were checked—a top, a middle and a low of the $NH_4O_3$—$NH_3$ mass. The only bands found were those that could be attributed to $NH_3$. By such method water may not be detected in the presence of ammonia but we were able to note its presence by the reaction with sodium whereby hydrogen is liberated. X-ray diffraction analysis indicated the presence of ammonium nitrate, and a qualitative test for the nitrate ion was positive. Since ammonium ion is the only cation present and equivalent amounts of nitrogen were found for the $NH_3$ and the nitrate, the compound must be in the form of ammonium nitrate, $NH_4NO_3$. We were thus able to establish qualitatively that oxygen, water and $NH_4NO_3$ are the decompositions of ammonium ozonate, i.e.

$$NH_4O_3 \rightarrow O_2 + H_2O + NH_4NO_3$$

while quantitatively:

$$2NH_4O_3 \rightarrow \tfrac{1}{2}O_2 + 2H_2O + NH_4NO_3$$

The quantitative results and procedures involved therein may be of interest. For such purposes we used the potassium ozonate-ammonium chloride reaction at $-30°$ C.:

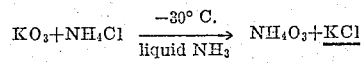

Known quantities of $KO_3$ and $NH_4Cl$ may be combined and the weight of the KCl precipitate readily determined. At $-30°$ C. the resultant $NH_4O_3$ rapidly decomposes and the amount of $O_2$ thus liberated may readily be determined. The driving force for this reaction is the formation of potassium chloride which, as indicated, is insoluble in liquid ammonia. The $NH_4O_3$ is quite unstable and only momentarily appears before its subsequent conversion to ammonium nitrate; however despite the instability we found that such procedure provided a very valuable analytical tool in characterizing ammonium ozonate.

For this process 0.5 gram $NH_4Cl$ was dissolved in 10 ml. liquid ammonia. A second solution was next prepared of 5 mls. of liquid $NH_3$ containing 5% $KO_3$ and the latter such solution added to the ammonium chloride in ammonia. Prior to solution mixing the potassium-ozonate solution is maintained at approximately $-196°$ C. As the reaction mixture is permitted to warm through to $-30°$ C. KCl is precipitated and the red color of the solution disappears as the result of $NH_4O_3$ decomposition.

We first determined the purity of the $KO_3$ available for such reaction by the following decomposition:

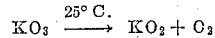

By weighing the sample of potassium ozonate and then measuring the volume of oxygen liberated we found that our $KO_3$ sample was 92% pure. We then reacted the $KO_3$ with $NH_4Cl$ in the following molar amounts:

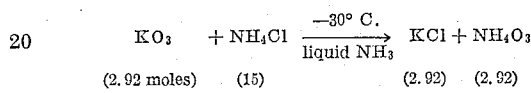

(2.92 moles)  (15)  (2.92)  (2.92)

and;

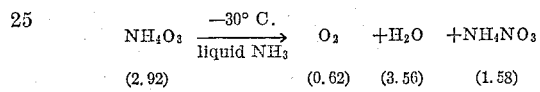

(2.92)  (0.62)  (3.56)  (1.58)

From such procedures the empirical formula of ammonium ozonate is calculated as $NH_{4.25}O_{3.02}$. From electron paramagnetic resonance studies we deduced the true formula to be $NH_4O_3$.

Our work on ammonium ozonate electron paramagnetic resonance studies was performed with the use of a Varian electron paramagnetic resonance spectrometer which consists of a 12-inch diameter electromagnet, a highly regulated magnetic power supply and a microwave generator and detector. In operation a tube containing the sample was placed in a specially designed Dewar which in turn is placed in a microwave cavity located between the magnetic pole faces. The Dewar used at both room and liquid nitrogen temperatures so as not to change the physical characteristics of the cavity. The sample is exposed to microwave radiation of a fixed frequency of 9300 millicycles per second. The magnetic field is slowly varied linearly and data corresponding to energy absorbed by the sample versus the magnetic field is displayed on the graphic recorder. Because of the detection scheme the recorder traces are proportional to the derivative of the absorption line. Although it is convenient to observe the absorption most of the required information is found in the derivative curve and so an integration is not performed.

It was found that ammonium ozonate at liquid nitrogen temperatures showed a strong absorption having a line width of 29 oersteds and a g. value of 2.0110. From this it is concluded that ammonium ozonate has an unpaired electron and a magnetic dipole movement of 1.73 Bohr magnetons. The possibility of two unpaired electrons is excluded since only a single resonance absorption was observed with no fine structure, and thus we concluded that the structure of ammonium ozonate is $NH_4O_3$. Such unpaired electron is of the utmost importance in providing the free radical reactions in the monopropellant.

The instant compositions, whether ammonium ozonate per se, ammonium ozonate with ammonia, or with methylamine, are burned, or exploded in the usual manner to utilize their rocket propulsion abilities.

It will be understood that modifications and variations may be effected without departing from the spirit or scope of the instant invention.

We claim as our invention:

The method of making an ammonium ozonate-ammonia mixture which comprises reacting dilute gaseous ozone with frozen ammonia, and maintaining said mixture at a temperature below −78° C.

References Cited by the Examiner

UNITED STATES PATENTS

| | | | |
|---|---|---|---|
| 2,628,889 | 2/53 | Benson | 23—190 |
| 2,721,792 | 10/55 | Hannum | 52—0.5 |
| 2,768,888 | 10/56 | Ryker | 52—0.5 |
| 2,835,556 | 5/58 | Boatright | 23—190 |

OTHER REFERENCES

Strecker et al.: "Chemische Berichte," vol. 53, part II, pages 2096–2101, 2102, 2105–2107, 2110–2113 (1920).

Mellor: "Comprehensive Treatise on Inorganic and Theoretical Chemistry," vol. 1, page 908 (1922).

Manchot: ibid., vol. 63B, pages 1225, 1226 (1930).

Manchot: "Deutsche Chemische Gesellschaft," vol. 46, pages 1089–1093 (1913).

Rideal: "Ozone," 1920, page 14.

Manchot et al.: "Berichte," vol. 40, pages 4984–4990 (1907).

Washburn et al.: "International Critical Tables," 1926, vol. I, pages 61–62.

Solomon et al.: "Journal of the American Chemical Society," vol. 84, pages 34–36 (January 5, 1962).

MAURICE A. BRINDISI, *Primary Examiner.*

LEON D. ROSDOL, ROGER L. CAMPBELL,
*Examiners.*